(12) United States Patent
Whang et al.

(10) Patent No.: US 10,528,369 B2
(45) Date of Patent: Jan. 7, 2020

(54) SCADA SYSTEM CAPABLE OF EFFICIENTLY CONFIGURING WINDOWS IN A SCREEN AREA

(71) Applicant: LSIS CO., LTD., Gyeonggi-do (KR)

(72) Inventors: Ho-Young Whang, Gyeonggi-do (KR); Seok-Chan Lee, Gyeonggi-do (KR); Seung-Ju Lee, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 164 days.

(21) Appl. No.: 15/415,508

(22) Filed: Jan. 25, 2017

(65) Prior Publication Data
US 2017/0329616 A1    Nov. 16, 2017

(30) Foreign Application Priority Data
May 10, 2016    (KR) .................. 10-2016-0056871

(51) Int. Cl.
*G05B 19/048* (2006.01)
*G05B 19/18* (2006.01)
(Continued)

(52) U.S. Cl.
CPC ........... *G06F 9/452* (2018.02); *G05B 19/042* (2013.01); *G06F 3/04845* (2013.01);
(Continued)

(58) Field of Classification Search
CPC .... G06F 9/452; G06F 3/04845; G06F 3/1454; G06F 17/245; G06F 2203/04803; G06F 3/048; G05B 19/042; G05B 2219/24215
See application file for complete search history.

(56) References Cited

U.S. PATENT DOCUMENTS

| | | | |
|---|---|---|---|
| 10,037,122 B2* | 7/2018 | Dyar | G06F 3/0481 |
| 2004/0006624 A1* | 1/2004 | Hawkinson | H04L 29/06 |
| | | | 709/227 |

(Continued)

FOREIGN PATENT DOCUMENTS

| | | |
|---|---|---|
| JP | 2001-290532 A | 10/2001 |
| JP | 2002-163017 A | 6/2002 |

(Continued)

OTHER PUBLICATIONS

Search Report dated May 23, 2017 issued in corresponding European Application No. 16204108.1.

*Primary Examiner* — Jeanette J Parker
(74) *Attorney, Agent, or Firm* — K&L Gates LLP

(57) ABSTRACT

Disclosed herein is a SCADA system that can adjust the size of a window added to the whole screen depending on the context of the window. The SCADA system includes a server that acquires data from remote apparatuses for system control and monitoring, and a display device that displays the acquired data via a dashboard. The server includes a control unit that creates the dashboard arranging and adjusting windows displaying data depending on the set context. In the SCADA system, windows can be configured efficiently in the whole screen area by adjusting the size of an added window opened by a user depending on the context of the window in the dashboard and changing the size of already created windows. As a result, the user' visibility can be improved.

11 Claims, 2 Drawing Sheets

(51) Int. Cl.
    *G06F 15/16*    (2006.01)
    *G06F 9/451*    (2018.01)
    *G05B 19/042*   (2006.01)
    *G06F 3/0484*   (2013.01)
    *G06F 3/14*     (2006.01)
    *G06F 17/24*    (2006.01)

(52) U.S. Cl.
    CPC .......... *G06F 3/1454* (2013.01); *G06F 17/245* (2013.01); *G05B 2219/24215* (2013.01); *G06F 2203/04803* (2013.01)

(56) References Cited

U.S. PATENT DOCUMENTS

| | | | | |
|---|---|---|---|---|
| 2010/0325211 A1* | 12/2010 | Ylinen | .................. | G06Q 10/06 709/205 |
| 2012/0029715 A1* | 2/2012 | Curt | ...................... | G01D 4/004 700/291 |
| 2012/0226367 A1* | 9/2012 | Tournier | .................. | G05B 9/03 700/82 |
| 2014/0108985 A1* | 4/2014 | Scott | ..................... | G06F 3/0484 715/771 |
| 2014/0336786 A1* | 11/2014 | Asenjo | ............... | G05B 19/4185 700/17 |
| 2015/0012511 A1* | 1/2015 | Chakra | ............. | G06F 17/30867 707/706 |
| 2016/0048312 A1 | 2/2016 | Holaso | | |
| 2017/0270195 A1* | 9/2017 | Zhang | ............... | G06F 17/30705 |

FOREIGN PATENT DOCUMENTS

| | | |
|---|---|---|
| JP | 2014-531652 A | 11/2014 |
| KR | 10-2013-0077379 A | 7/2013 |
| KR | 10-1413353 B1 | 6/2014 |
| KR | 10-2016-0023754 A | 3/2016 |

* cited by examiner

- Prior Art -

# SCADA SYSTEM CAPABLE OF EFFICIENTLY CONFIGURING WINDOWS IN A SCREEN AREA

CROSS REFERENCE TO RELATED APPLICATION

This application claims the benefit of Korean Patent Application No. 10-2016-0056871, filed on May 10, 2016, entitled "SCADA SYSTEM", which is hereby incorporated by reference in its entirety into this application.

BACKGROUND

1. Technical Field

The present disclosure relates to a SCADA system.

2. Description of the Related Art

A supervisory control and data acquisition (SCADA) system is a control system in which a central control system monitors remote apparatuses by collecting, receiving, logging and displaying state information data, i.e., points, on the remote apparatuses with a remote terminal unit via analog or digital signals on the communications path.

Typically, the SCADA system centrally monitors and controls a variety of remote installations such as power plants, transmission and distribution facilities, petrochemical plants, steel plants, factory automation facilities, etc.

The SCADA system performs a function of monitoring and alarming that conducts predefined operations according to an alarm state of the remote apparatuses, a function of monitoring/controlling that operates the remote apparatuses manually/automatically, and a function of displaying that receives, displays and logs the state information on the remote apparatuses.

Incidentally, the SCADA system handles complicated and a massive amount information. To efficiently provide users with such information from the SCADA, screen configuration and information display manner is very important.

FIG. 1 is a view showing a layout of windows for a SCADA system.

Referring to FIG. 1, when a window 14 is added to the screen, the SCADA system equally divides the whole screen area 10 by the number of the windows. As a result, the windows 12 in the screen area 10 automatically arranged to have the same size irrespectively of the context they have.

Accordingly, the SCADA system arranges the windows of the same size all together in the whole screen, and thus users watch several windows simultaneously such that the visibility is degraded.

SUMMARY

It is an object of the present disclosure to provide a SCADA system capable of efficiently configure windows in the whole screen area by adjusting the size of the windows and changing the size of already created windows depending on the context of a newly added window in a dashboard by a user.

It is another object of the present disclosure to provide a SCADA system capable of improving a user's visibility by efficiently configuring windows in the whole screen area.

Objects of the present disclosure are not limited to the above-described objects and other objects and advantages can be appreciated by those skilled in the art from the following descriptions. Further, it will be easily appreciated that the objects and advantages of the present disclosure can be practiced by means recited in the appended claims and a combination thereof.

In accordance with one aspect of the present disclosure, a SCADA system includes: a server configured to acquire data from remote apparatuses for system control and monitoring. The server includes a control unit configured to create a dashboard in which the acquired data is displayed, and to adjust a layout or sizes of windows depending on a context of the windows or importance of keywords associated with the windows, wherein the windows are displayed in the dashboard and data is displayed in the windows. The server may further include a storage unit, and the keywords are stored in the storage unit. The keywords may be indexed with data information to be displayed in a screen of the dashboard.

The server may further include: a communications unit configured to receive state data from the remote apparatuses periodically; and a display unit configured to display the state data of the remote apparatuses via the dashboard.

The data information may include information on a list of acquired data, a graph, graphic information, a single-line data, and a table.

The context of the windows may represent whether at least one of a graph, a table and a grid table is included, and a layout of the important data.

The importance of the keywords set in association with the windows may be determined based on whether a list of the importance of keywords set by a user is included.

The control unit may calculate an available space in a whole screen of the dashboard based on the context or the importance of keywords associated with the window added by a user, and change the sizes of already displayed windows to add the window to the screen.

The control unit may change length and breadth of the windows by a certain percentage depending on the context of the window.

The control unit may check the importance of the context of the window to display data row by row or column by column.

The control unit may highlight a window displayed in the dashboard depending on the context of the window or the importance of the keyword associated with the window.

The control unit may display a message on the screen of the dashboard or triggers an alarm to a user if the window is highlighted, and the window may be enlarged until the alarm is released or the user recognizes the alarm.

In the SCADA system according to the exemplary embodiment of the present disclosure, windows can be configured efficiently in the whole screen area by adjusting the size of the windows and changing the size of already created windows depending on the content of a newly added window in a dashboard by a user.

According to an exemplary embodiment of the present disclosure, a user's visibility can be improved by efficiently configuring windows in the whole screen area.

DETAILED DESCRIPTION

Figure 1:
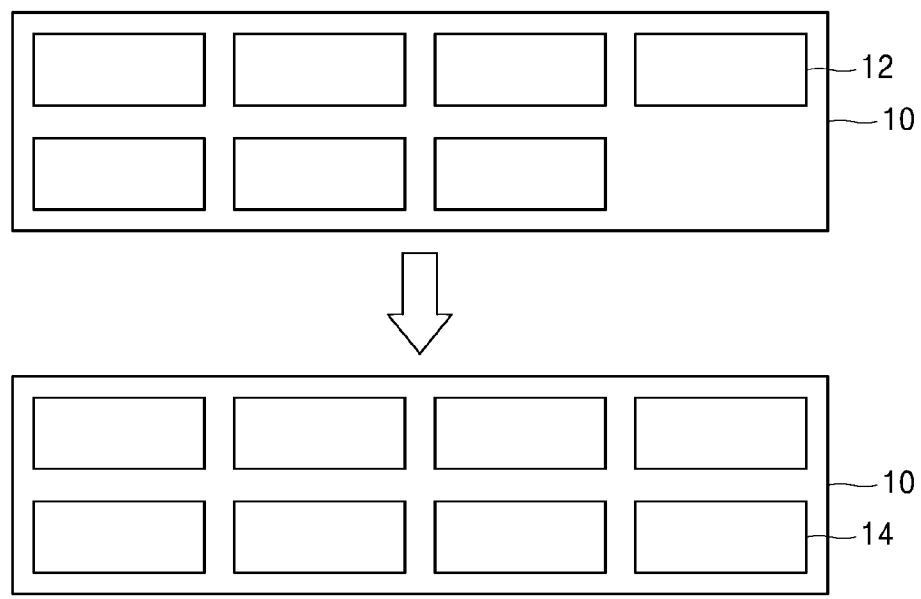
FIG. 1 is a view showing a layout of windows for a SCADA system.

The above objects, features and advantages will become apparent from the detailed description with reference to the accompanying drawings. Embodiments are described in sufficient detail to enable those skilled in the art in the art to easily practice the technical idea of the present disclosure. Detailed descriptions of well known functions or configurations may be omitted in order not to unnecessarily obscure the gist of the present disclosure. Hereinafter, embodiments of the present disclosure will be described in detail with reference to the accompanying drawings. Throughout the drawings, like reference numerals refer to like elements.

Figure 2:
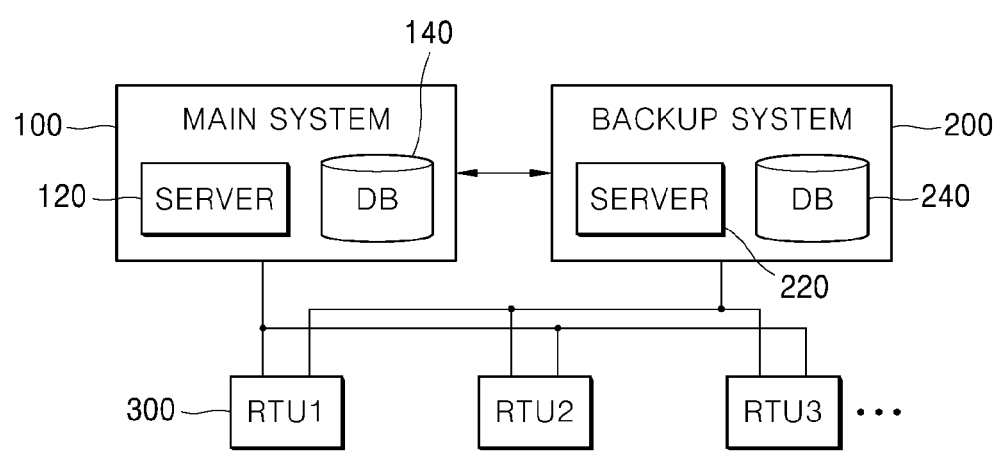
FIG. 2 is a block diagram of a SCADA system according to an exemplary embodiment of the present disclosure.

FIG. 2 is a block diagram of a SCADA system according to an exemplary embodiment of the present disclosure.

Referring to FIG. 2, the SCADA system according to the exemplary embodiment of the present disclosure includes a main system 100, a backup system 200 and remote apparatuses 300.

The main system 100 includes a server 120 and a database 140 and is connected to a plurality of remote apparatuses 300. In addition, the main system 100 receives state data from the remote apparatuses periodically to monitor the remote apparatuses 300. The database 140 may store the state data received from the remote apparatuses periodically.

If there is no problem in communications between the main system 100 and the remote apparatuses 300, the main system 100 receives a list of communications states between the backup system 200 and the remote apparatuses 300 from the backup system 200.

The backup system 200 is connected to the plurality of remote apparatuses 300 and performs the functionality of the main system 100 if the main system 100 cannot operate normally. Accordingly, the backup system 200 has the same configuration with the main system 100.

In addition, the backup system 200 receives a request for state data of the remote apparatuses from the main system 100, and the backup system 200 may work as a server that transmits the requested data.

The remote apparatuses 300 are connected to the main system 100 and the backup system 20, and transmit the state data to the main system 100 and the backup system 200 periodically. For example, the remote apparatuses may be various types of meters and monitoring apparatuses disposed in power plants, transmission and distribution facilities, petrochemical plants, steel plants, factory automation facilities, etc.

Figure 3:
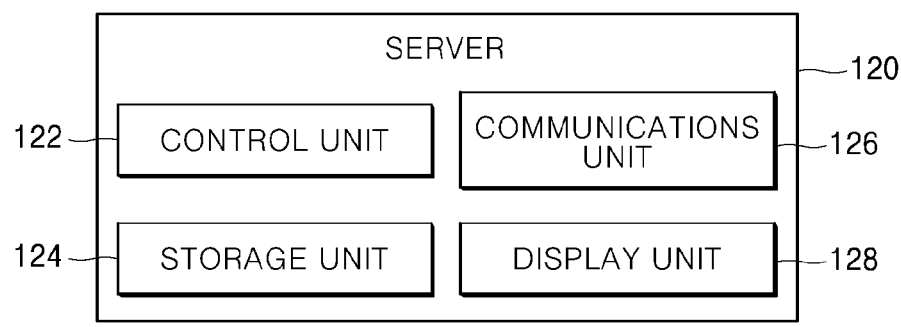
FIG. 3 is a block diagram of a server of a main system according to an exemplary embodiment of the present disclosure.
Figure 4:
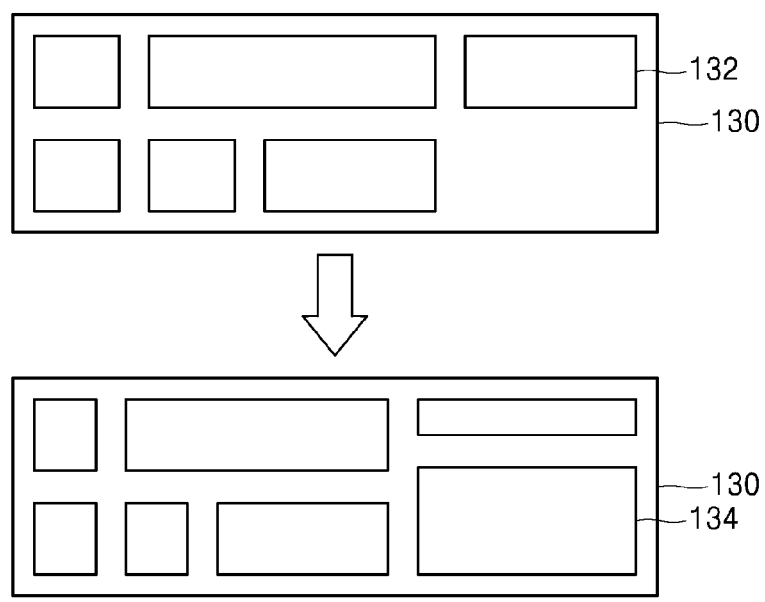
FIG. 4 is a view showing a screen of a dashboard according to an exemplary embodiment of the present disclosure.

FIG. 3 is a block diagram of a server of a main system according to an exemplary embodiment of the present disclosure. FIG. 4 is a view showing a screen of a dashboard according to an exemplary embodiment of the present disclosure.

Referring to FIG. 3, a server 120 of the main system 100 according to the exemplary embodiment of the present disclosure includes a control unit 122, a storage unit 124, a communications unit 126 and a display unit 128.

The control unit 122 controls the overall operation of the server and may create a dashboard that can monitor the state data of the remote apparatuses 300. The dashboard may adjust the size of windows depending on the context of a window newly created by a user and the importance of a keyword associated with the window, and may create the added window on the screen. The context may represent the content of a window added by a user and the importance of a keyword associated with the window and may include a graph, a table and a grid table. The size of the grid table may be adjusted by the user with a mouse on the display device.

The dashboard is a user interface that allows users to centrally manage and find a variety of information from a web on a screen. Users may centrally manage the state data of the remote apparatuses 300 via the windows arranged on the whole screen of the dashboard.

Referring to FIG. 4, if the context of a window newly added to the dashboard by a user is a graph, the control unit 122 reads out graph information stored in the storage unit 124, calculates the space to be occupied by the added window on the whole screen 130 of the dashboard, and changes the size of the existing windows already displayed on the screen.

In addition, the control unit 122 may adjust the size of the windows depending on the importance of a keyword associated with the newly added window and may add the window 134 to the screen. If the context of the newly added window is a graph, the control unit 122 may reduce the length and breadth of the graph by a certain percentage to thereby fit it to the size of the added window 134.

If the keyword associated with a graph displayed in the added window 134 is important, the control unit 122 enlarges the size of the window 134 so that it is larger than a window 132 already open on the whole screen 130 of the dashboard, and displays the newly added window 134. The control unit 122 determines whether it is important information based on the keyword already stored in the storage unit 124. If the keyword is important, the control unit 122 highlights the newly added window 134 in various ways. For example, the control unit 122 may make the boarder of the newly added window 134 thicker, may display the boarder of the window with a different color, or may display the activated window brighter.

In addition, the user may sort keywords to determine their importance and may classify the importance of the information stored in the storage unit 124 to set it. The information stored in the storage unit 124 may include a graph, a table, a single-line data, etc. In addition, if it is difficult to classify the importance of the keywords such as a graph or a table, the value set by the user when the information is stored in the storage unit 124 may be seen as a keyword.

In addition, if the context of the window newly added to the dashboard by the user is a table, the control unit 122 reads out the data information stored in the storage unit 124 that is to be displayed on the screen, and calculates the available space in the whole screen of the dashboard to change the size of the windows already displayed on the screen. In addition, the control unit 122 may adjust the size of the windows depending on the importance of the keyword associated with a newly added window and may add the window to the screen.

If a keyword associated with a table displayed in the added window 134 is not important, the control unit 122 adjusts the size of the window so that it is smaller than windows already open on the whole screen of the dashboard, thereby displaying table information necessary for the newly added window. The information on the table may include a record indicative of row data of the table. When the content of a table is displayed in a newly added window of the dashboard, it may be determined whether the content of the table is displayed horizontally or vertically depending on which is important between content in row (horizontal) direction or content in column (vertical) direction. In addition, since the content in row direction is important for a tabular view, the content of the table may be displayed horizontally in the newly added window of the dashboard.

In addition, if the context of the window newly added to the dashboard by the user is a grid table, the control unit 122 reads out the data information stored in the storage unit 124 that is to be displayed on the screen, and calculates the available space in the whole screen of the dashboard to change the size of the windows already displayed on the screen. In addition, the control unit 122 may adjust the size of the windows depending on the importance of the keyword associated with a newly added window and may add the window to the screen.

If a keyword associated with a grid table displayed in the added window 134 is important, the control unit 122 adjusts the size of the window so that it is larger than windows already open on the whole screen of the dashboard, thereby displaying grid table information necessary for the newly added window. The information on the grid table may represent attributes indicating column data of the table. When the grid table is displayed on the newly added window of the dashboard, the data of the grid table that is of high importance may be displayed as column data. Finally, if the context of the window newly added to the dashboard by the user is graphic information, the control unit 122 reads out the data information stored in the storage unit 124 that is to be displayed on the screen, and calculates the available space in the whole screen of the dashboard to adjust the size of the windows already displayed on the screen. In addition, the control unit 122 may adjust the size of the windows depending on the importance of the keyword associated with a newly added window and may add the window to the screen. The graphic information may include a single-line diagram. For example, the single-line diagram may be displayed in a simplified form mainly with major connection lines among the remote apparatuses.

In addition, the control unit 122 arranges windows in the whole screen of the dashboard such that there is no empty space, and enlarges the highlighted window to display it. A window is highlighted when an alarm is triggered. An enlarged window may be displayed until the alarm is released or a user recognizes the alarm.

When an alarm is triggered, a window may blink, the board of a window may become thicker, the board of a window may be displayed with a different color, or a window may be displayed with a particular color, so that a user may recognize it. In addition, if a serious alarm is triggered, a message may be displayed on the screen of the dashboard or a message may be sent to the user.

In addition, if there is no window in the whole screen of the dashboard, a window having the same size as the whole screen may be added.

In the storage unit 124, keywords are stored, which can be indexed with data information to be displayed in the screen of the dashboard. The page information may include a list, information on a graph and a table, etc.

The communications unit 126 receives state data from the remote apparatuses 400 periodically and communicates with the backup system 200 periodically. The main system 100 or the backup system 200 may be connected to the remote apparatuses 300 via RS-232 communications.

The display unit 128 may display the state data of the remote apparatuses 300 so that the user may see it via the dashboard to allow the user to manage the remote apparatuses 300 centrally.

As set forth above, in the SCADA system according to the exemplary embodiment of the present disclosure, windows can be configured efficiently in the whole screen area by adjusting the size of the windows and changing the size of already created windows depending on the content of a newly added window in a dashboard by a user. In addition, according to an exemplary embodiment of the present disclosure, a user's visibility can be improved by efficiently configuring windows in the entire screen area.

The present disclosure described above may be variously substituted, altered, and modified by those skilled in the art to which the present invention pertains without departing from the scope and sprit of the present disclosure. Therefore, the present disclosure is not limited to the above-mentioned exemplary embodiments and the accompanying drawings.

What is claimed is:

1. A supervisory control and data acquisition (SCADA) system comprising:
   a main system comprising a server and a database;
   a backup system configured to perform the functionality of the main system if the main system cannot operate normally; and
   a plurality of remote apparatuses, including at least a meter, connected to the main system and the backup system,
   wherein the plurality of remote apparatuses are configured to periodically transmit state data to the main system and the backup system,
      wherein the server is configured to acquire state data from the remote apparatuses for system control and monitoring,
      wherein the server comprises:
      a control unit configured to
         create a dashboard in which the acquired data is displayed, and to adjust a layout or size of windows depending on a context of the windows or an importance of keywords associated with the windows,
            wherein the windows are displayed in the dashboard and data is displayed in the windows, and
            wherein the database periodically stores the state data received from the remote apparatuses
         wherein the backup system receives a request for the state data of the remote apparatuses from the main system, the backup system works as a server that transmits the requested data, and
         the remote apparatuses are connected to the main system and the backup system, and transmit the state data to the main system and the backup system periodically.

2. The SCADA system of claim 1, wherein the server further comprises:
   a storage unit,
   wherein the keywords are stored in the storage unit, and
   wherein the keywords are indexed with data information to be displayed in a screen of the dashboard.

3. The SCADA system of claim 1, wherein the server further comprises:
   a communications unit configured to receive state data from the remote apparatuses periodically; and
   a display unit configured to display the state data of the remote apparatuses via the dashboard.

4. The SCADA system of claim 2, wherein the data information comprises information on a list of acquired data, a graph, graphic information, a single-line data, and a table.

5. The SCADA system of claim 2, wherein the context of the windows represents whether at least one of a graph, a table and a grid table is included, and a layout of an important data, wherein the important data is identified by an importance indication stored with the important data in the storage unit.

6. The SCADA system of claim 1, wherein the importance of the keywords set in association with the windows is determined based on whether a list of the importance of the keywords set by a user is included.

7. The SCADA system of claim 1, wherein the control unit calculates an available space in a whole screen of the dashboard based on the context or the importance of keywords associated with the window added by a user, and changes the sizes of the already displayed windows to add the window to the screen.

8. The SCADA system of claim 1, wherein the control unit changes length and breadth of the windows by a certain percentage depending on the context of the window.

9. The SCADA system of claim 1, wherein the control unit checks an importance of the context of the window to display data row by row or column by column.

10. The SCADA system of claim 1, wherein the control unit highlights a window displayed in the dashboard depending on the context of the window or the importance of the keyword associated with the window.

11. The SCADA system of claim 10, wherein the control unit displays a message on the screen of the dashboard or triggers an alarm to warn a user if the window is highlighted, and wherein the window is enlarged until the alarm is released or the user recognizes the alarm.

\* \* \* \* \*